(12) United States Patent
Wu

(10) Patent No.: US 10,055,102 B2
(45) Date of Patent: Aug. 21, 2018

(54) METHOD OF PROMPTLY STARTING WINDOWED APPLICATIONS INSTALLED ON A MOBILE OPERATING SYSTEM AND DEVICE USING THE SAME

(71) Applicant: INSYDE SOFTWARE CORP., Taipei (TW)

(72) Inventor: Tsung-En Wu, Taipei (TW)

(73) Assignee: INSYDE SOFTWARE CORPORATION, Taipei (TW)

( * ) Notice: Subject to any disclaimer, the term of this patent is extended or adjusted under 35 U.S.C. 154(b) by 405 days.

(21) Appl. No.: 14/044,947

(22) Filed: Oct. 3, 2013

(65) Prior Publication Data
US 2014/0359518 A1    Dec. 4, 2014

(30) Foreign Application Priority Data
May 31, 2013  (TW) .............................. 102119318 A

(51) Int. Cl.
G06F 3/048       (2013.01)
G06F 3/0484      (2013.01)
G06F 3/0481      (2013.01)
G06F 3/0488      (2013.01)

(52) U.S. Cl.
CPC ........ G06F 3/04842 (2013.01); G06F 3/0481 (2013.01); G06F 3/0488 (2013.01); G06F 3/04817 (2013.01)

(58) Field of Classification Search
CPC ... G06F 3/0486; G06F 3/482; G06F 17/30882
See application file for complete search history.

(56) References Cited

U.S. PATENT DOCUMENTS

| | | | | |
|---|---|---|---|---|
| 5,734,380 A | * | 3/1998 | Adams .................. | G06F 3/0481 715/792 |
| 2005/0010876 A1 | * | 1/2005 | Robertson et al. ........... | 715/782 |
| 2012/0159395 A1 | * | 6/2012 | Deutsch et al. .............. | 715/835 |
| 2013/0120447 A1 | * | 5/2013 | Kim ........................ | G06T 11/60 345/629 |
| 2013/0300684 A1 | * | 11/2013 | Kim ...................... | G06F 3/0488 345/173 |
| 2013/0305184 A1 | * | 11/2013 | Kim ...................... | G06F 3/0481 715/781 |

(Continued)

*Primary Examiner* — Anil N Kumar
(74) *Attorney, Agent, or Firm* — Muncy, Geissler, Olds & Lowe, P.C.

(57) ABSTRACT

A device of promptly starting windowed applications installed on a mobile operating system (OS) provides a starting button on a mobile device running the mobile OS installed thereon to promptly start a windowed application menu. The windowed application menu can be used to add or remove applications installed on the mobile OS to be started under a windowed mode to or from the windowed application menu. When users press the starting button to open the windowed application menu and execute any application in the application menu, the selected application is displayed in the windowed mode. The windowed application menu includes, but is not limited to, default applications installed on the mobile OS. Execution of any third-party application under the windowed mode can be supported by the windowed application menu. Accordingly, the operational efficiency and convenience of the mobile OS can be enhanced.

12 Claims, 12 Drawing Sheets

(56) References Cited

U.S. PATENT DOCUMENTS

| | | | | |
|---|---|---|---|---|
| 2013/0321340 A1* | 12/2013 | Seo | ............... | G06F 1/1641 |
| | | | | 345/174 |
| 2013/0346872 A1* | 12/2013 | Scott | ............... | G06F 3/0237 |
| | | | | 715/738 |
| 2014/0164989 A1* | 6/2014 | Kuhne | ............... | 715/790 |
| 2014/0344951 A1* | 11/2014 | Brewer | ............... | 726/28 |
| 2014/0351748 A1* | 11/2014 | Xia | ............... | G06F 3/0481 |
| | | | | 715/798 |

\* cited by examiner

METHOD OF PROMPTLY STARTING WINDOWED APPLICATIONS INSTALLED ON A MOBILE OPERATING SYSTEM AND DEVICE USING THE SAME

BACKGROUND OF THE INVENTION

1. Field of the Invention

The present invention relates to a starting device for starting software application with a mobile operating system (OS), and, more particularly, to a method of starting software applications installed on the ANDROID OS in a multi-window mode and to a device using the starting method.

2. Description of the Related Art

Commonly used mobile OSs in the current market can be classified into either multi-tasking type or single-tasking type. A single-tasking OS in a single-tasking platform, such as iPhone®, allows users to run one application (App) at a time, while a multi-tasking OS in a multi-tasking platform, such as the Android OS, allows users to run multiple applications simultaneously.

As each ANDROID OS has a kernel, which is developed based on Linux and provides basic functions of OS, development of Apps running on the ANDROID OS becomes the job of app developers. System manufacturers and app developers can adaptively build mobile devices equipped with the ANDROID OS tailored to different market demands. With reference to FIGS. 11 and 12, a conventional ANDROID OS has a default system screen 90. The system screen 90 has a status bar 91 on a bottom of the system screen 90. The status bar 91 has a notification area 92 and multiple command icons. The notification area 92 is located on one end of the status bar 91 and serves to display current time and remaining power of a mobile device equipped with the ANDROID OS. The command icons are arranged on the other end of the status bar 91. The default command icons available to current ANDROID OS are a back button 93, a home button 94, and a recent app listing button 95.

The back button 93 is clicked for the ANDROID OS to return to a previous screen. The home button 94 is clicked for the system to go back to an initial system screen 90. The recent app listing button 95 is clicked to list all applications, which have been executed recently, for users to select and execute desired applications. After being selected, each started app on the system screen 90 is displayed in a full-screen mode. For certain mobile device equipped with the ANDROID OS, the status bar 91 further has a starting key 96 and an app menu 97. The starting key 96 takes the form of an up arrow initially, and is located on a center of the status bar 91. Once clicked, the starting key 96 is changed to the form of a down arrow key, the back button 93, the home button 94, and the recent app listing button 95 are hidden, and the app menu 97 is popped up on the system screen 90 and is displayed above the system bar 91. The app menu 97 sequentially lists all default applications of the system for users to conveniently and promptly select and start those applications. After being started, the applications in the app starting menu 97 are displayed in a multi-window mode.

However, except the default applications in the app menu 97, other third-party applications are unable to be incorporated into the app menu 97. In other words, except the default applications in the app menu 97, other applications should be executed under a full-screen mode. Furthermore, if intending to select and start non-default applications of the system, users need to return to a previous screen or switch to the initial system screen 90. The foregoing command icons are hidden once the app menu 97 is displayed. Hence, inconvenience arises because users must close the app menu 97 before returning to the system screen 90.

SUMMARY OF THE INVENTION

An objective of the present invention is to provide a method of promptly starting applications installed on a mobile OS and a device using the same. The device and the method can be implemented by providing a starting button on a mobile device to promptly open a windowed application menu such that any application installed on the mobile OS to be started under a windowed mode can be added to and removed from the windowed application menu, and operational flexibility and convenience of the mobile OS can be enhanced.

To achieve the foregoing objective, the method of promptly starting applications installed on a mobile OS is performed by the mobile OS in a mobile device and has steps of:

providing a status bar and a system screen on the mobile OS, wherein the status bar has multiple command icons and a starting button;

generating a windowed application menu corresponding to multiple applications installed on the mobile OS;

determining if receiving an input signal generated by clicking the starting button; and simultaneously displaying the status bar and starting the applications corresponding to the windowed application menu under a windowed mode when receiving the input signal.

The foregoing method allows users to add or remove applications already installed on the mobile OS to or from the windowed application menu. The applications include, but are not limited, to default applications of the mobile OS. As any application in the windowed application menu can be executed under the windowed mode, a multi-tasking OS can simultaneously perform multiple applications on the system screen without conflicting with each other, and the operational flexibility of the application menu can be further enhanced.

To achieve the foregoing objective, the mobile device has a touch panel and a processor.

The touch panel has a display and a touch pad. The display serves to display a windowed application menu corresponding to multiple applications.

The processor is connected to the display and the touch pad and runs a mobile OS, wherein the mobile OS has a system screen with a status bar, and the status bar has multiple command icons and a starting button.

The processor determines if receiving an input signal generated by clicking the starting button, displays the status bar on the display after receiving the input signal, and starts a corresponding application in the windowed application menu under a windowed mode.

To achieve the foregoing objective, alternatively, the mobile device has a processor and a touch panel.

The processor runs a mobile operating system installed on the mobile device and performing the foregoing method to provide a configuration mode and an execution mode. The configuration mode is operated to add the applications already installed on the mobile OS to the windowed application menu, and the execution mode is operated to display the windowed application menu.

The touch panel has a touch pad, a display, and a starting button. The touch pad is connected to the processor. The display is connected to the processor. The starting button serves to start the execution mode.

The foregoing mobile device can add or remove applications already installed on a mobile OS to or from the windowed application menu, and provides a dedicated starting button to start the windowed application menu for users to select one of the applications for execution under a windowed mode.

Other objectives, advantages and novel features of the invention will become more apparent from the following detailed description when taken in conjunction with the accompanying drawings.

DETAILED DESCRIPTION OF THE INVENTION

Figure 1:
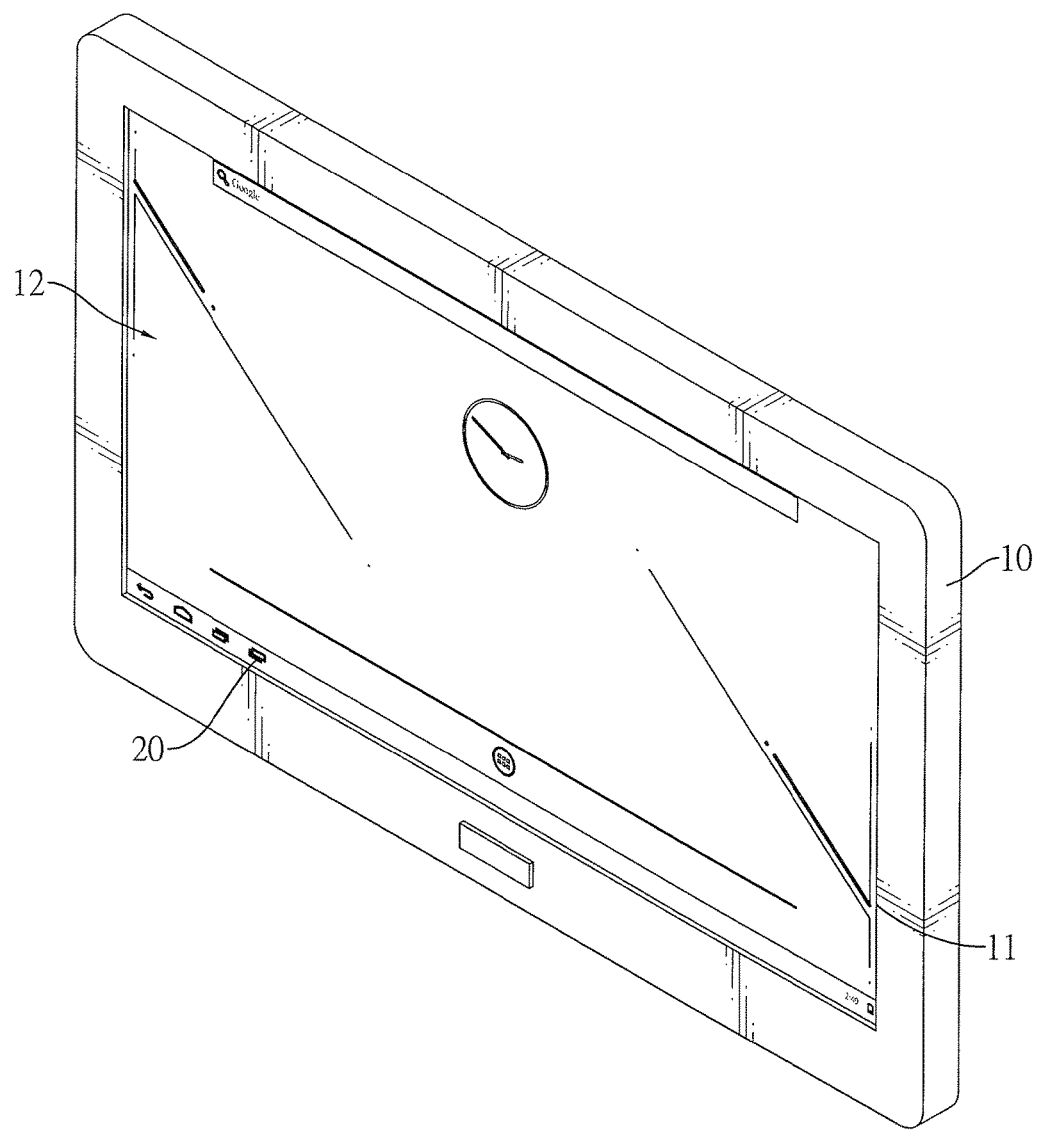
FIG. 1 is a perspective view of a first embodiment of a mobile device in accordance with the present invention.

With reference to FIG. 1, a first embodiment of a mobile device in accordance with the present invention has a processor and a touch panel 10. The touch panel 10 has a touch pad 11 and a display 12. The touch pad 11 and the display 12 are electrically connected to the processor. The processor runs a mobile OS and provides a configuration mode and an execution mode.

The mobile OS may be an ANDROID OS or other mobile OS with a similar kernel structure that only provides basic functions of OS while leaving development of applications running on the mobile OS to users or application developers. The mobile OS includes, but is not limited to, the ANDROID OS in the following description.

Figure 2:
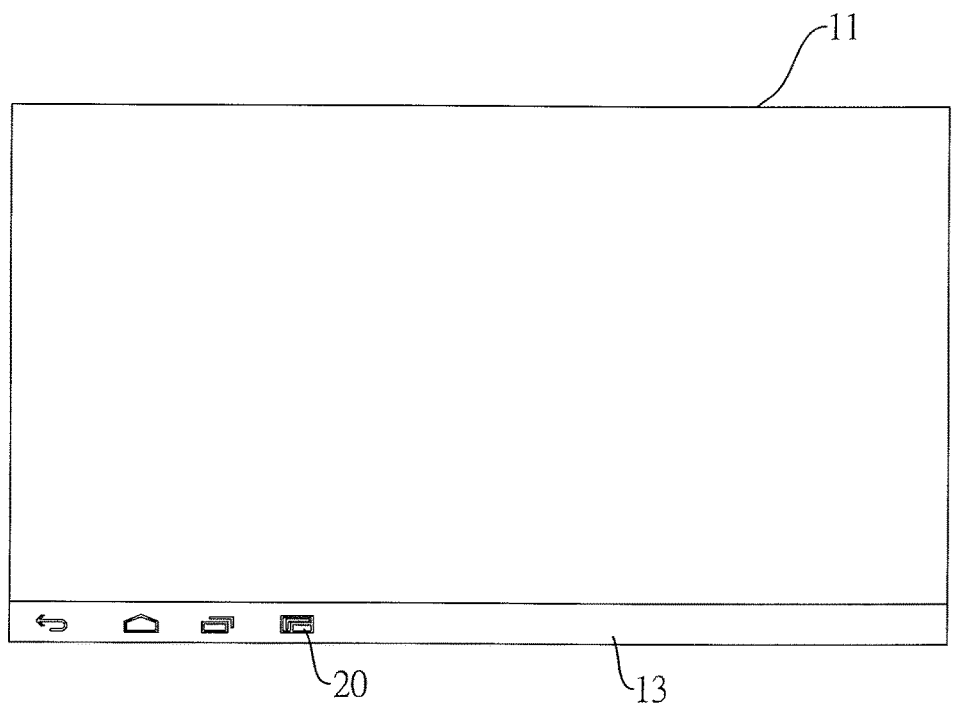
FIG. 2 is a schematic view of an initial system screen of the mobile device in FIG. 1.
Figure 3:
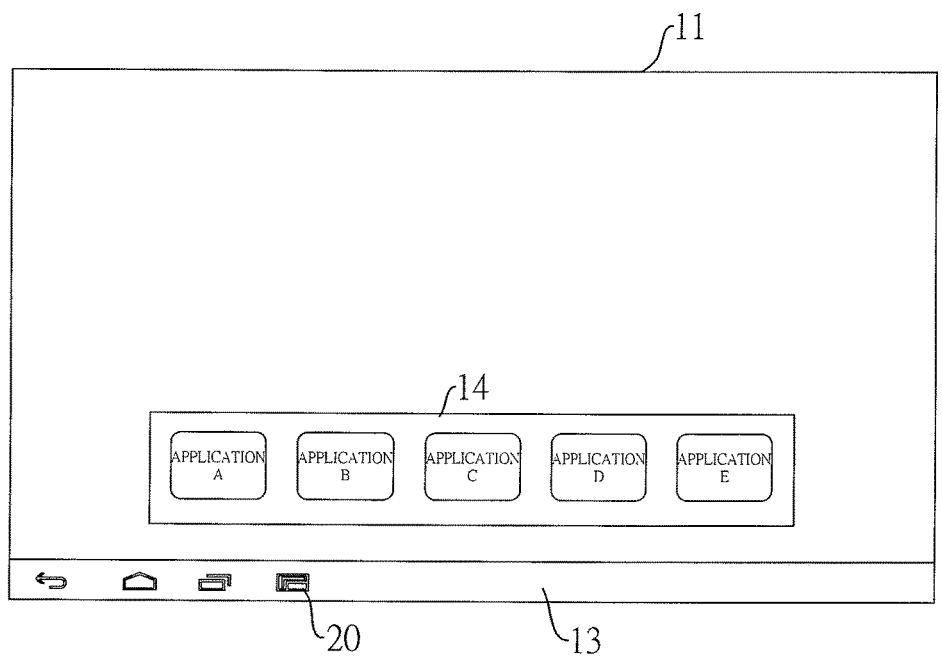
FIG. 3 is a schematic view of the system screen in FIG. 2 with an app menu displayed thereon.

With reference to FIGS. 2 and 3, the mobile OS provides a system screen, which is displayed on the touch panel 10. The system screen has a status bar 13 on a bottom of the system screen. The status bar 13 has multiple command icons and a starting button 20. The command icons are arranged on one end of the status bar 13, and include a back button, a home button, and a recent app listing button. The starting button 20 serves to allow users to click on desired applications displayed on the system screen during the configuration mode, and then start the applications during the execution mode.

After the starting button 20 is clicked, the system screen has a windowed app menu 14 displayed thereon and located above the status bar 13 to be ready for operation under the execution mode so that the applications already installed on the mobile OS can be added to and are orderly arranged in the app menu 14 through the configuration mode. It must be stressed that before or after the execution mode is performed, the applications already installed on the mobile OS can be added to or removed from the app menu 14 through the configuration mode.

Figure 4:
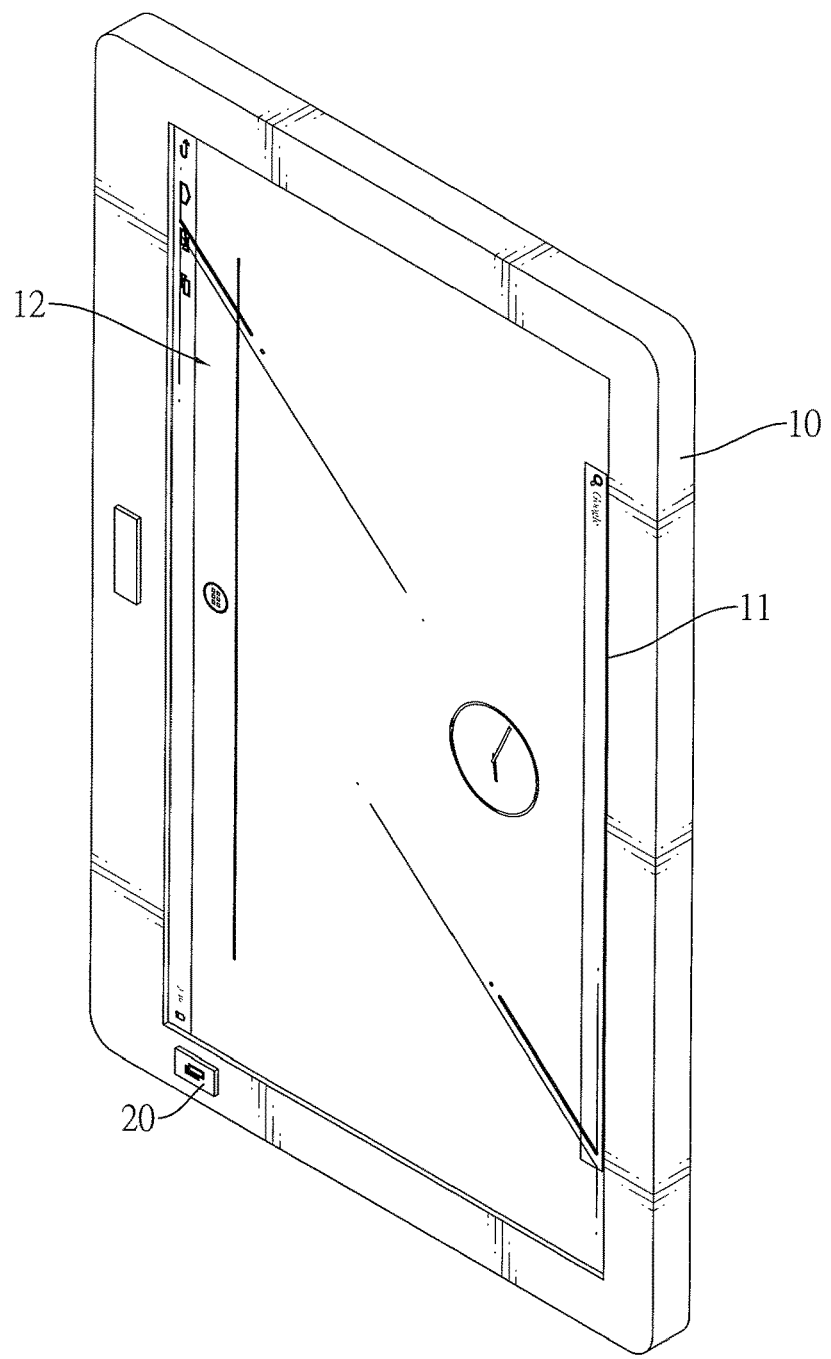
FIG. 4 is a perspective view of a second embodiment of a mobile device in accordance with the present invention.

In the present embodiment, the starting button 20 is located on the status bar 13 of the system screen. In other words, the starting button 20 is formed by a virtual button in a display area of the touch panel 10. With reference to FIG. 4, a first embodiment of a mobile device in accordance with the present invention is substantially the same as the foregoing embodiment except that the starting button 20 is a physical button mounted on a non-display area of the touch panel 10 and electrically connected to the processor so that users can directly press the starting button 20 to perform the execution mode and the app menu 14 can be displayed.

Figure 5:
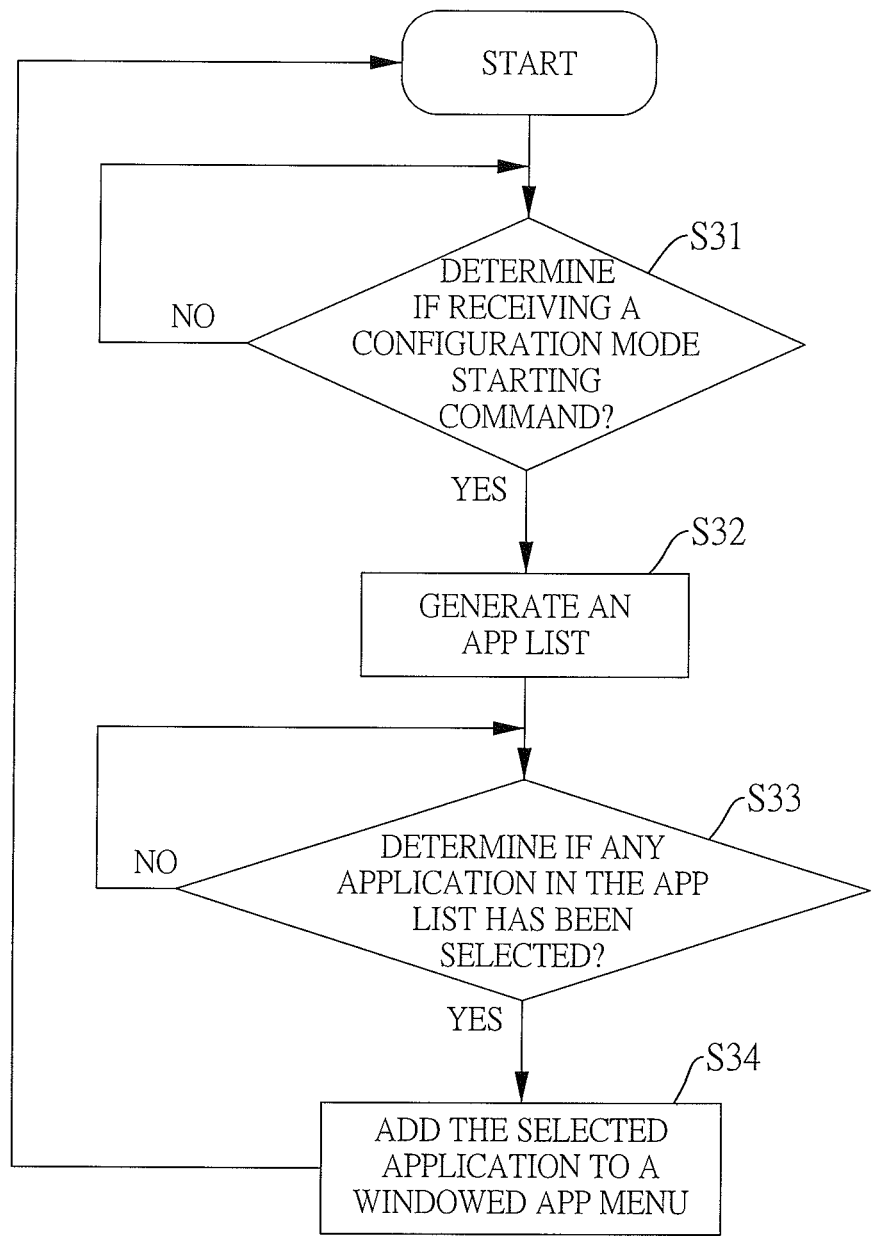
FIG. 5 is a flow diagram associated with a configuration mode of a mobile operating system in accordance with the present invention.

A method of promptly starting windowed applications is performed by a mobile OS in the foregoing mobile device, and has a configuration mode and an execution mode. With reference to FIG. 5, the configuration mode has the following steps.

Step 31: Determine if receiving a configuration mode starting command (S31). The configuration mode starting command is provided by a button generated on the system screen. If the determined result is positive, go to next step. Otherwise, resume the current step.

Step 32: Generate an app list (S32). The app list includes all applications already installed on the mobile OS.

Step 33: Determine if any application in the app list has been selected (S33). If the determined result is positive, go to next step. Otherwise, resume the current step.

Step 34: Add the selected application(s) to a windowed app menu (S34).

Figure 6:
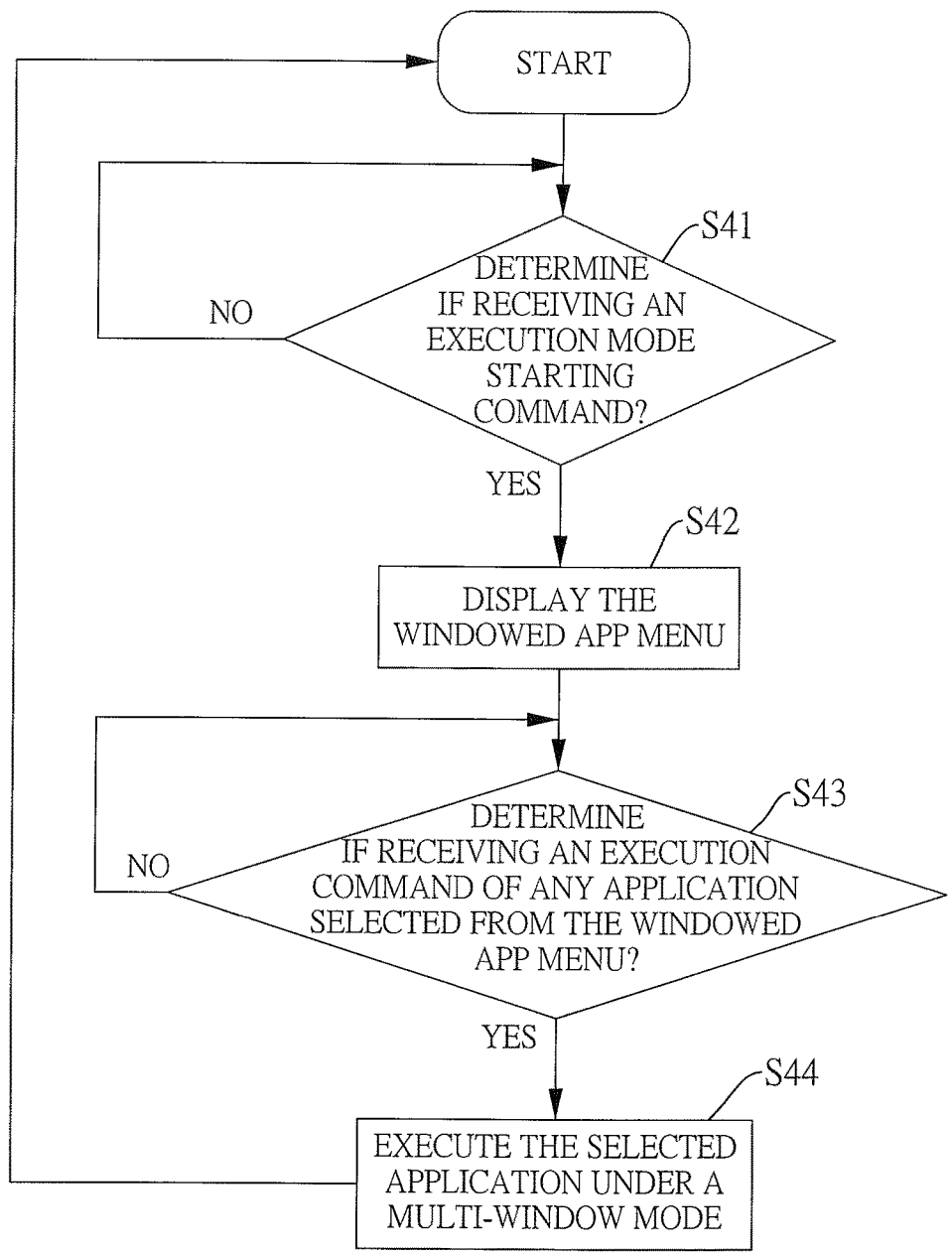
FIG. 6 is a flow diagram associated with an execution mode of a mobile operating system in accordance with the present invention.

With reference to FIG. 6, the execution mode has the following steps.

Step 41: Determine if receiving an execution mode starting command (S41). The execution mode starting command is an input signal generated by pressing the starting button 20. If the determined result is positive, go to next step. Otherwise, resume the current step.

Step 42: Display the windowed app menu (S42). The windowed app menu has all the applications selected from the app list in the configuration mode and added to the windowed app menu.

Step 43: Determine if receiving an execution command of any application selected from the windowed app menu (S43). The execution command is issued by users' click on the application in the windowed app menu. If the determined result is positive, go to next step. Otherwise, resume the current step.

Step 44: Execute the selected application under a multi-window mode (S44).

From the foregoing steps, during the configuration mode, any application to be started under a multi-window mode can be added to enhance the operational flexibility and convenience of the mobile OS. During the execution mode, any application in the windowed app menu can be executed and displayed in a multi-window mode so that any applications including third-party applications installed on the mobile OS, instead of just the default applications installed on the mobile OS, can be executed in a multi-window mode.

Figure 7:
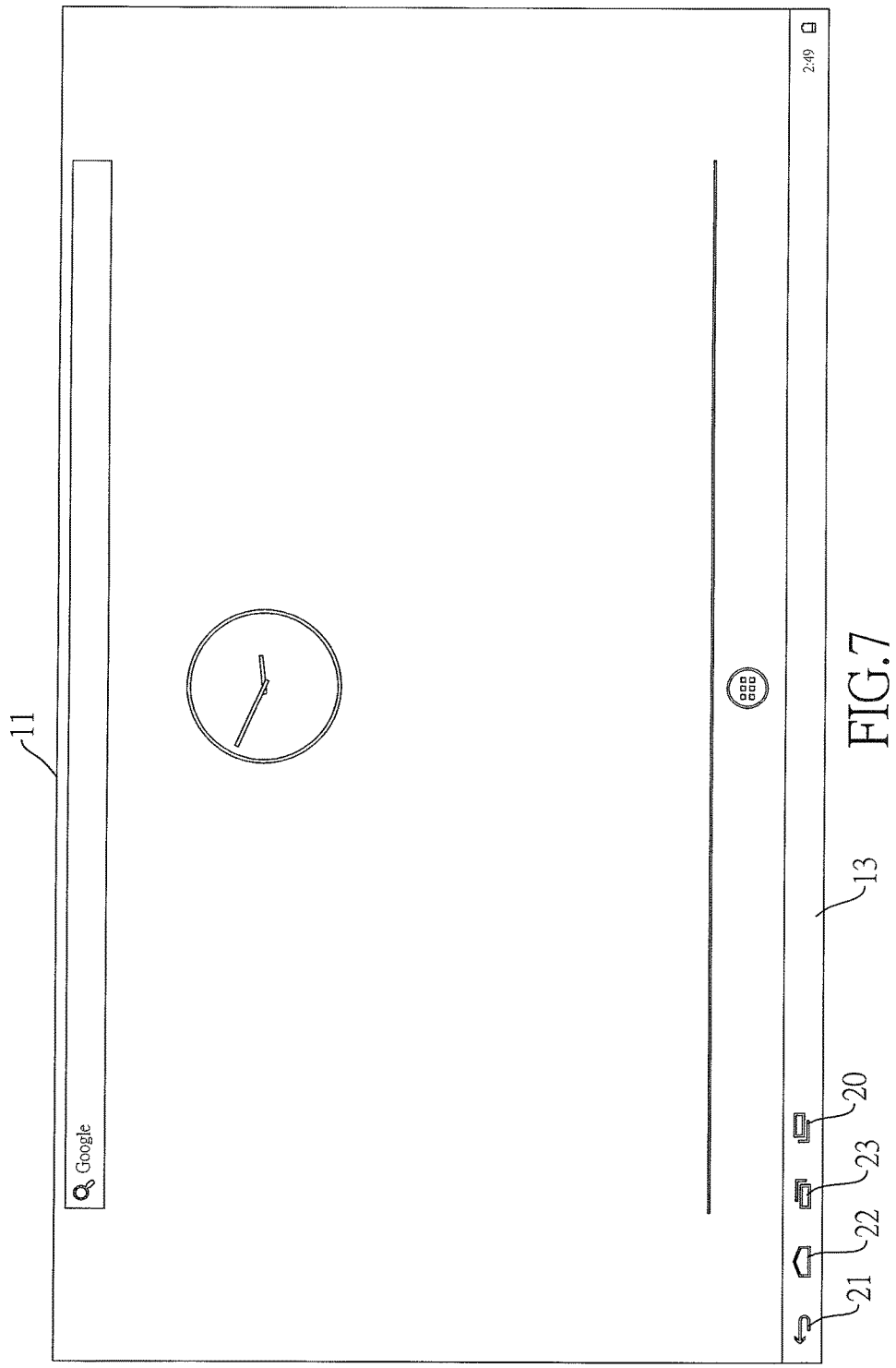
FIG. 7 is a schematic view of an initial system screen of a mobile operating system in accordance with the present invention.

To further explain a physical implementation of the foregoing embodiments, with reference to FIG. 7, a system screen of a mobile OS installed on a mobile device has a status bar 13, a windowed app menu 14, multiple command icons, and a starting button 20. The command icons include a back button 21, a home button 22, and a recent app listing button 23. The back button 21 is clicked for the ANDROID OS to return to a previous screen. The home button 22 is clicked for the system to go back to the initial system screen. The recent app listing button 23 is clicked to list all applications, which have been executed recently.

The mobile device may be a smart phone, a tablet personal computer (PC), a notebook PC, a desktop PC, a television, or the like. The operation of the mobile device may be diversified. Given the case that options are selected by clicking, the operation of using fingers to touch the options on the touch panel 10, or using a stylus to click on the options, is supported on devices supporting cursor pointer, such as notebook PC, desktop PC, television, and the like.

Figure 8:
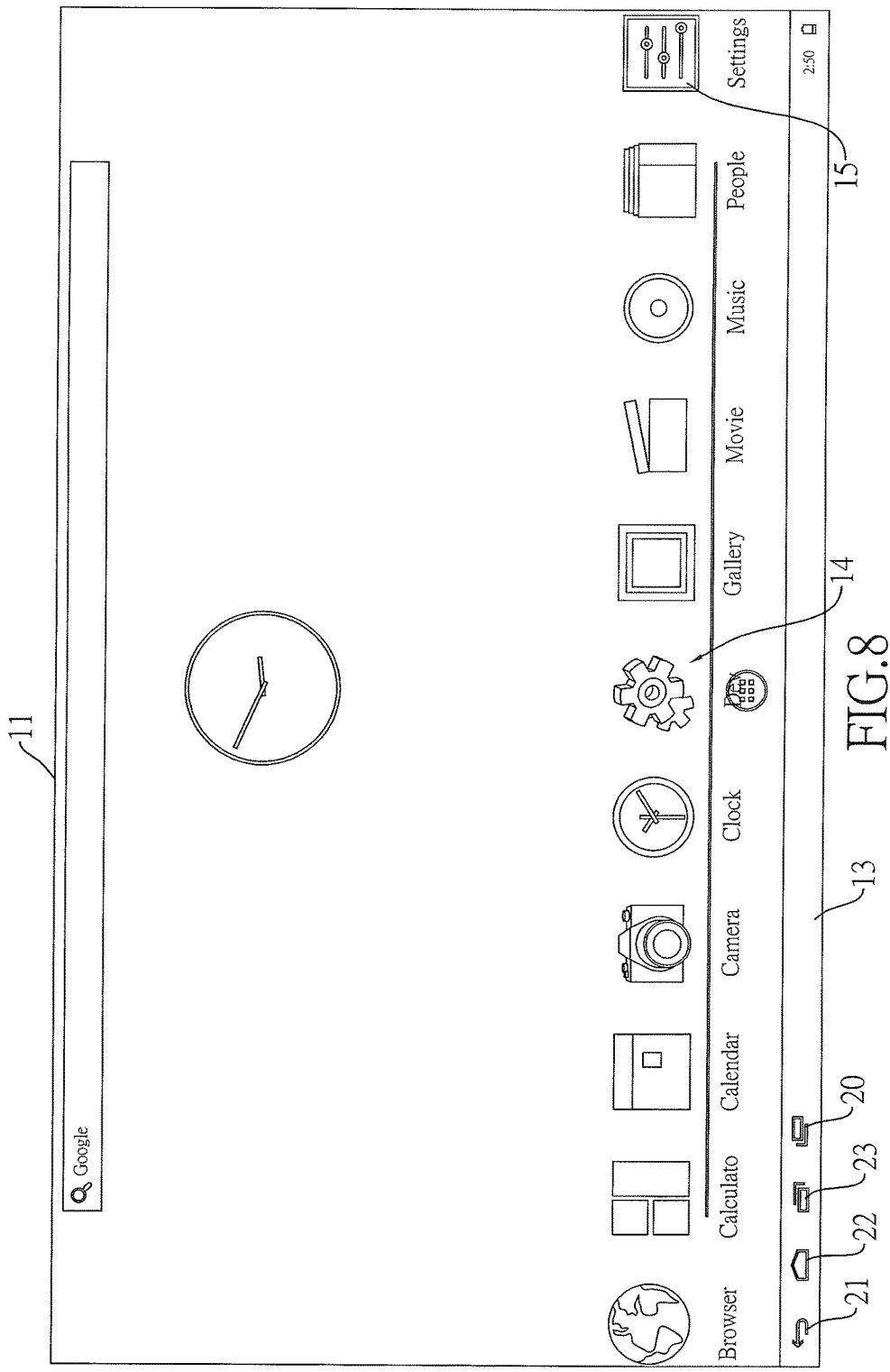
FIG. 8 is a schematic view of the system screen in FIG. 7 with an app menu displayed on the system screen.
Figure 9:
FIG. 9 is a schematic view of the system screen in FIG. 7 with an app list displayed on the system screen.

With reference to FIG. 8, after users click on the starting button 20, the mobile OS receives an execution mode starting command and displays the windowed app menu 14 above the status bar 13. Meanwhile, the back button 21, the home button 22, and the recent app listing button 23 still exist for user to return to a previous screen or an initial screen or to list all recently executed applications for promptly starting, rendering operational flexibility and convenience in operation. The app menu 14 includes multiple applications already installed on the mobile OS and orderly arranged on the system screen. The app menu has a setting button 15 for starting the configuration mode. When the setting button 15 is clicked, the mobile OS receives a configuration mode starting command and then generates an app list 151 as shown in FIG. 9. The app list 151 has an option of a multi-window mode 1511 and an app list 1512. The app list 1512 serves to list all applications already installed on the mobile OS, and has multiple checkboxes corresponding to installed applications for users to click thereon and add the clicked application to the app menu.

Figure 10:
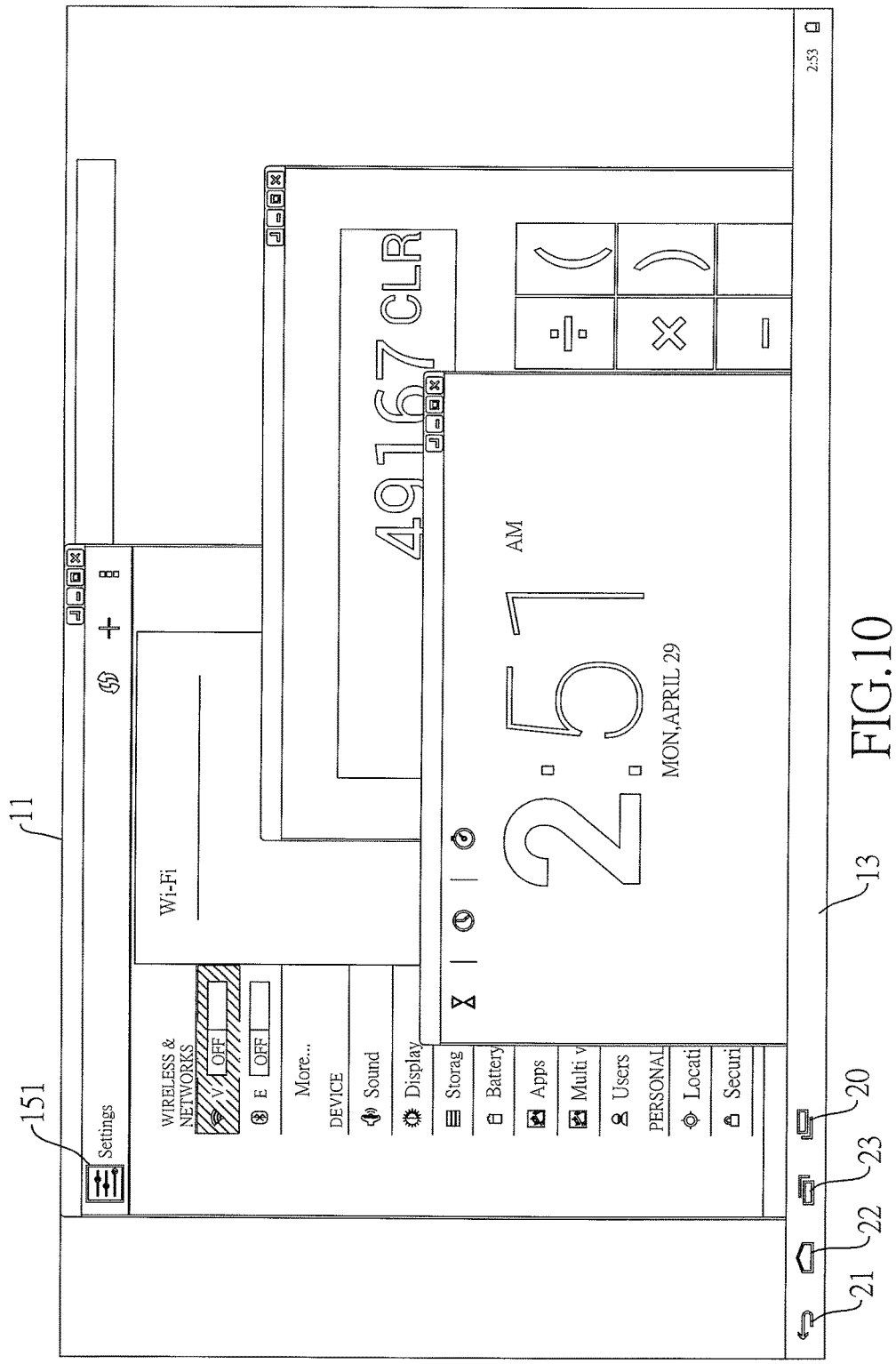
FIG. 10 is a schematic view of the system screen in FIG. 7 with multiple applications simultaneously running under a multi-window mode.
Figure 11:
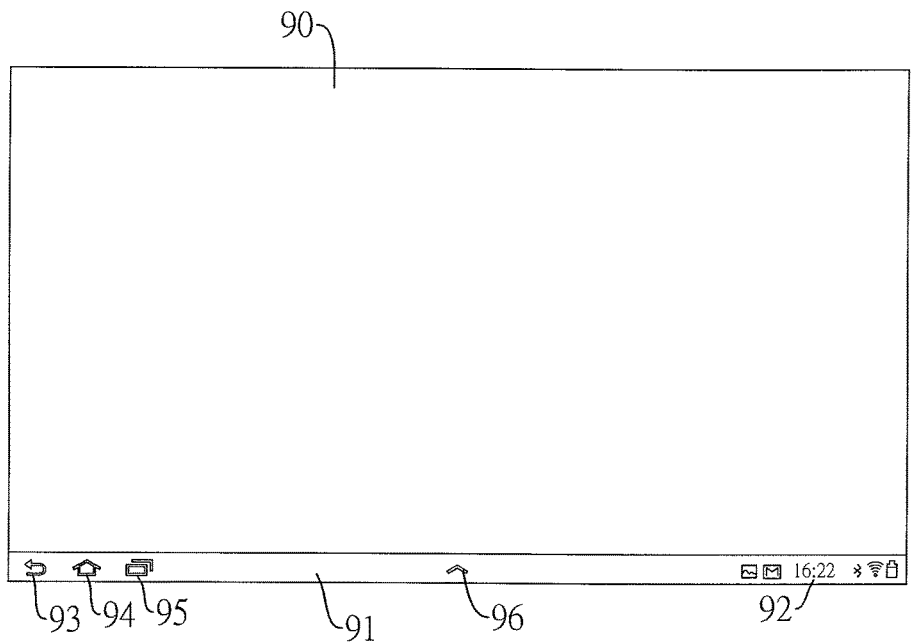
FIG. 11 is a schematic view of a system screen of a conventional ANDROID OS.
Figure 12:
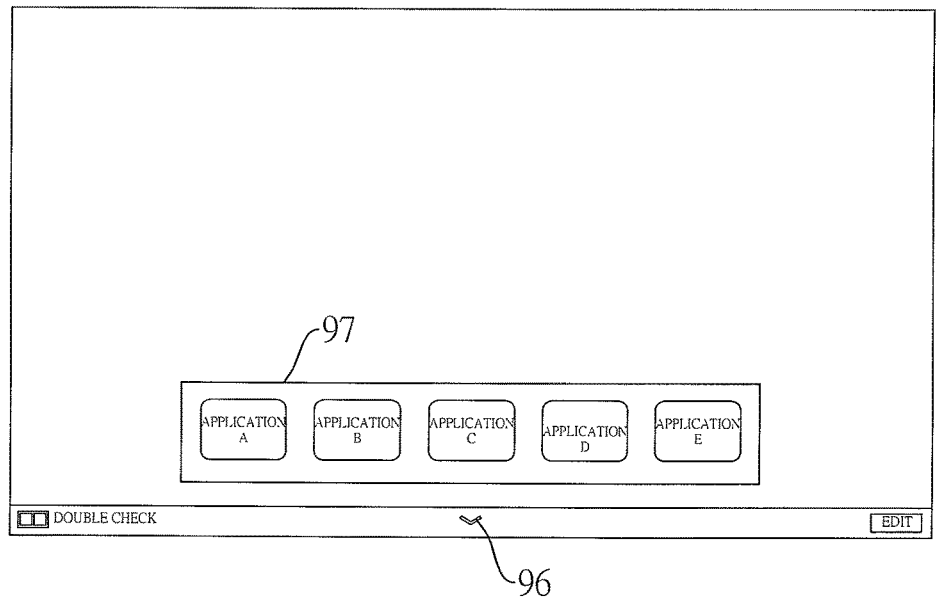
FIG. 12 is a schematic view of the system screen with an app menu displayed on the system screen of FIG. 11.

With reference to FIG. 10, users can add the applications already installed on the mobile OS to the windowed app menu 14 through the foregoing configuration mode. The added applications are not limited to the default application of the mobile OS. Depending on operation demand, each application installed on the mobile OS can be added and deleted under the configuration mode. After the configuration mode, each application in the app menu 14 can be started under the execution mode so that any application installed on the mobile OS can be executed under the multi-window mode. As multiple applications can be run under the multi-window mode, a multi-tasking OS can execute and display multiple applications on the system screen simultaneously.

The window of each application running under the multi-window mode is movable, and the size and the display sequence of the windows on the system screen are adjustable for optimal viewing effect of all the applications displayed on the system screen. For example, when an application is started under the execution mode, the mobile OS first draws a window frame on the system screen and executes an application within the window frame. The window frame contains a title bar, and the maximize, minimize and close buttons for users to conveniently display or close the applications displayed on the system screen with a display sequence.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method of promptly starting windowed applications installed on a mobile operating system (OS), the method performed by the mobile OS in a mobile device having a display that defines a system screen and comprising steps of:

providing a status bar as a part of the system screen of the mobile OS, wherein the status bar has multiple command icons including a home button and a starting button;

receiving a first input signal generated by clicking the starting button;

if the input signal is received, generating a windowed application menu within the system screen, the windowed application menu including at least one icon each of which corresponds to a single application selected from multiple applications installed on the mobile OS and for a configuration mode;

receiving a second input signal generated by selecting one of the at least one icon in the windowed application menu;

executing only the single application corresponding to the selected one of the at least one icon in the windowed application menu when receiving the second input signal; and simultaneously displaying the status bar and the executed single application under a windowed mode, wherein the step of generating a windowed application menu further has steps of:

generating an application list corresponding to the multiple applications installed on the mobile OS in the configuration mode for selection for adding to the windowed application menu;

selecting at least one of the applications from the application list; and adding the at least one application selected to the windowed application menu.

2. The method as claimed in claim 1, wherein the step of generating a windowed application menu further has a step of installing the multiple applications on the mobile OS.

3. The method as claimed in claim 1, wherein the step of selecting the at least one of the applications further has steps of: providing an option of a windowed mode and a checkbox for each application installed on the mobile OS; and selecting the installed application by clicking a corresponding checkbox.

4. A mobile device having a mobile operating system (OS) installed therein, comprising:

a touch panel having:

a display defining a system screen and serving to display a windowed application menu within the system screen, the windowed application menu including at least one icon each of which corresponds to a single application selected from multiple applications installed on the mobile OS and for a configuration mode; and a touch pad; and a processor connected to the display and the touch pad and running the mobile OS, wherein the system screen includes a status bar, and the status bar has multiple command icons including a home button and a starting button;

the processor determines if receiving a first input signal generated by clicking the starting button, displays the windowed application menu on the display after receiving the first input signal, receives a second input signal generated by selecting one of the at least one icon in the windowed application menu, executes only the single application corresponding to the selected one of the at least one icon in the windowed application menu when the second input signal is received, and simultaneously displays the status bar and the executed single application under a windowed mode, and the processor generates an application list corresponding to the multiple applications installed on the mobile OS in the configuration mode for selection for adding to the windowed application menu, receives a selection of at least one of the applications from the application list, and adds the at least one application selected to the windowed application menu.

5. The mobile device as claimed in claim 4, wherein the starting button is formed by a virtual button in a display area of the touch panel.

6. A mobile device, comprising:

a processor running the mobile operating system (OS) installed on the mobile device and performing the method as claimed in claim 1 to provide the configuration mode and an execution mode, wherein the configuration mode is operated to add the applications already installed on the mobile OS to the windowed application menu, and the execution mode is operated to display the windowed application menu; and a touch panel having:
a touch pad connected to the processor;
a display connected to the processor and defining the system screen; and
the starting button serving to start the execution mode.

7. The mobile device as claimed in claim 6, wherein in the execution mode, an execution command of any application selected from the windowed application menu is received and the selected application is executed under the windowed mode.

8. The mobile device as claimed in claim 6, wherein in the configuration mode, an application list corresponding to the applications installed on the mobile OS is generated and at least one of the applications from the application list is selected, and the selected at least one application is added to the windowed application menu.

9. The mobile device as claimed in claim 8, wherein the at least one of the applications from the application list is selected by providing an option of a windowed mode and a checkbox for each application installed on the mobile OS; and selecting the installed application by clicking a corresponding checkbox.

10. The mobile device as claimed in claim 6, wherein the starting button is formed by a virtual button in a display area of the touch panel.

11. The mobile device as claimed in claim 6, wherein the starting button is a physical button mounted on a non-display area of the touch panel.

12. A mobile device having a mobile operating system (OS) installed therein, comprising:

a touch panel having:
a display defining a system screen and serving to display a windowed application menu within the system screen, the windowed application menu including at least one icon each of which corresponds to a single application selected from multiple applications installed on the mobile OS and for a configuration mode; and
a touch pad;

a starting button physically mounted on a non-display area of the touch panel; and a processor connected to the display, the touch pad and the starting button, and running the mobile OS, wherein the system screen includes a status bar, and the status bar has multiple command icons;

the processor determines if receiving a first input signal generated by clicking the starting button, displays the windowed application menu on the display after receiving the first input signal, receives a second input signal generated by selecting one of the at least one icon in the windowed application menu, executes only the single application corresponding to the selected one of the at least one icon in the windowed application menu when the second input signal is received, and simultaneously displays the status bar and the executed single application under a windowed mode, and the processor generates an application list corresponding to the multiple applications installed on the mobile OS in the configuration mode for selection for adding to the windowed application menu, receives a selection of at least one of the applications from the application list, and adds the at least one application selected to the windowed application menu.

* * * * *